Figure 1:
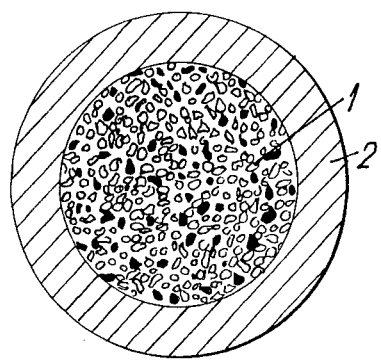

United States Patent
Sissons et al.

[11] 3,834,002
[45] Sept. 10, 1974

[54] METHOD OF MANUFACTURING A COMPOSITE METAL SHEATHED WELDING ELECTRODE

[75] Inventors: Anthony Chamberlen Sissons, Frodsham near Warrington; Malcolm Anthony Cairns, Gateshead, both of England

[73] Assignee: Pyrotenox Limited, Hebburn-on-Tyne, Durham, England

[22] Filed: Sept. 8, 1972

[21] Appl. No.: 287,438

[30] Foreign Application Priority Data
Sept. 10, 1971 Great Britain............... 42380/71

[52] U.S. Cl............. 29/420.5, 29/420, 29/DIG. 11, 219/146
[51] Int. Cl............................................. B22f 3/24
[58] Field of Search............. 29/DIG. 11, DIG. 31; 219/145, 146, 420, 420.5

[56] References Cited
UNITED STATES PATENTS

| | | | |
|---|---|---|---|
| 2,219,462 | 10/1940 | Wissler................ | 219/145 |
| 3,036,205 | 5/1962 | Aida et al............ | 219/146 |
| 3,122,434 | 2/1964 | Reed et al........... | 29/420.5 UX |
| 3,365,565 | 1/1968 | Claussen.............. | 219/146 |
| 3,514,572 | 5/1970 | Toritani et al...... | 219/145 |
| 3,533,152 | 10/1970 | Gloor et al.......... | 29/420.5 |
| 3,643,061 | 2/1972 | Duttera et al....... | 219/146 |

*Primary Examiner*—Charles W. Lanham
*Assistant Examiner*—D. C. Reiley, III
*Attorney, Agent, or Firm*—Webb, Burden, Robinson & Webb

[57] ABSTRACT

A composite metal sheathed welding electrode is manufactured as a continuous operation by drawing a preformed metallic tube containing a particulate material consisting of or comprising a deoxidizing agent vertically downward through a drawing die. The die is of such a form that the tube is reduced in diameter during its passage through the die and powder or granules are fed into a part of the tube in advance of the die at a rate to maintain the said part substantially full of powder or granules. The height of the column of particles above the die is at least sufficient to avoid "pushback" of particles. The overall diameter of the filled tube is then further reduced to compact further the particulate core. The preformed tube may be of a composite form comprising inner and outer parts, the outer part being of a different metallic material from that of the inner part.

13 Claims, 6 Drawing Figures

METHOD OF MANUFACTURING A COMPOSITE METAL SHEATHED WELDING ELECTRODE

In the electric arc welding process and in other welding processes in which a consumable electrode is employed it has been the practice to use, for the consumable electrode, an electrode of composite form. One composite electrode that has been employed comprises a core, including a fluxing agent and, surrounding the core, a longitudinally seamed sheath that has been formed by folding a metal strip transversely about the core so that its longitudinal edges abut, the composite electrode being brought to the desired diameter by drawing. More recently it has been proposed to enclose the core in a seamless metal tube because, by abolishing the seam, transfer of electric current is improved and risk of contamination of the core by oil or grease from the seam and risk of moisture ingress into the core through the seam are eliminated. Moreover, the tendency for the seamed sheath to split along the seam when the composite electrode is bent or otherwise flexed is also removed.

An object of the present invention is to provide an improved method of manufacturing a composite metal sheathed welding electrode of the kind having a seamless metal sheath. The invention also includes a composite metal sheathed welding electrode made by the aforesaid method.

According to the invention a composite metal sheathed welding electrode is manufactured by introducing into one end of a preformed metallic tube containing a material selected from the group of materials consisting of a deoxidizing agent and a mixture of at least two materials including a deoxidizing agent, which material is in particulate form and is suitable for constituting the core of a composite metal sheathed welding electrode, substantially vertically downward through a drawing die of such a form that the tube is reduced in diameter during its passage through the die and feeding powder or granules into a part of the tube in advance of the die at a rate to maintain the said part substantially full of particles, the height of the column of particles above the die being at least sufficient to avoid "push-back" of particles, and subsequently further reducing the overall diameter of the filled tube so formed to compact further the particulate core and to reduce the filled tube to an overall diameter rendering it suitable for use as a composite metal sheathed welding electrode.

The core material will consist of or include sufficient deoxidising agent or flux to perform its normal function of preventing oxidation and other side reactions and removing oxides.

Before finally reducing the filled tube to an overall diameter to render it suitable for use as a composite welding electrode a second tube of a metal or metal alloy different from that of the first tube may be drawn over and reduced in diameter to grip the filled tube and the overall diameter of the filled composite tube so formed further reduced to an overall diameter to render it suitable for use as a composite welding electrode.

Before the powdered or granular material or mixture of powdered or granular materials is introduced into the preformed tube one or more rods of metal or metal alloy may be positioned in the tube, which metal or metal alloy may be different from that of the tube, to provide for the manufacture of a composite welding electrode having within its sheath or sheaths a core constituted in part by compacted powder or granular material or materials and in part by one or more metal wires.

Compaction of the powder or granules in the tube is preferably effected by means of any one or more of the techniques generally used in the manufacture of mineral insulated electric cables, that is cables comprising one or more conductors insulated in a compacted mass of powdered mineral insulation, usually magnesium oxide, and enclosed in a metal sheath. Such techniques include agitating, vibrating or oscillating the tube and/or a ram and/or other parts of the filling apparatus. The open end of the tube will normally be sealed after the tube has been filled and before reduction in overall diameter of the filled tube is effected. Reduction in overall diameter of the filled tube or filled composite tube may, for instance, be effected by drawing the filled tube or composite tube through a series of dies of decreasing size or by passing it through a series of rolls.

During mechanical drawing or rolling of the filled tube or filled composite tube through a series of dies or rolls the filled tube or composite tube may be subjected to any intermediate annealing as may be necessary to produce a composite welding electrode of sufficient flexibility to permit it to be coiled, and if desired, to be subjected to further cold working. The mechanical drawing or rolling initially assists in further consolidation and compacting of the powder or granules and ensures a very high and uniform density to the powdered or granular core throughout the finished composite welding electrode.

Preferably during the drawing operation the tube is vibrated, for instance laterally vibrated. This packs the powder or granules to some extent and reduces the magnitude of the change in density that would otherwise be required to be imparted by the operation of drawing the tube and its contents through the die and so enables the final density to be more consistent.

Where the core is made from a mixture of two or more materials in powder or granular form, these materials may comprise, in addition to the deoxidising agent or flux, slag-forming and alloying additives. Slag-forming additives that may be employed include rutile, calcium fluoride, limestone, alkaline earth carbonates and alkaline earth oxides. Alloying additives that may be employed include pure metal, metal carbides, metal borides and intermetallic compounds. The size of the granules or of the particles of the powder will depend to a large extent upon their composition and upon the initial size of the bore of the tube but preferably the granules or particles are of a size lying within the range 50 to 500 microns. The initial size of the or each tube will also to some extent depend on the metal or metal alloy of which it is made but it will also depend on the proportion of the cross-sectional area of the composite welding electrode that is to be constituted by the metal or metal alloy.

The invention also includes an electric welding process in which is employed a composite metal sheathed welding electrode manufactured in accordance with the present invention.

The method of the present invention has the important advantage that it will produce a composite metal sheathed welding electrode which has a well compacted core and which initially may be sealed at each of its ends. The method is especially, but not exclusively, suitable for manufacturing composite welding electrodes of which the powdered or granular core material includes a metal alloy which is difficult to obtain in wire form because of its low ductility, for instance aluminum bronze.

Figure 2:
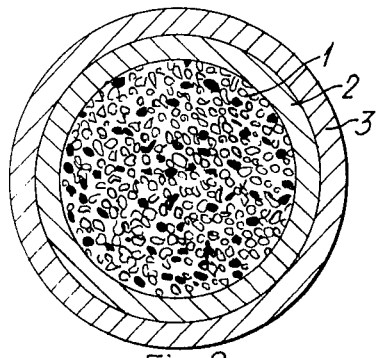
Figure 3:
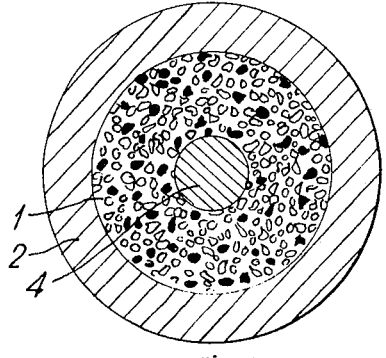
Figure 4:
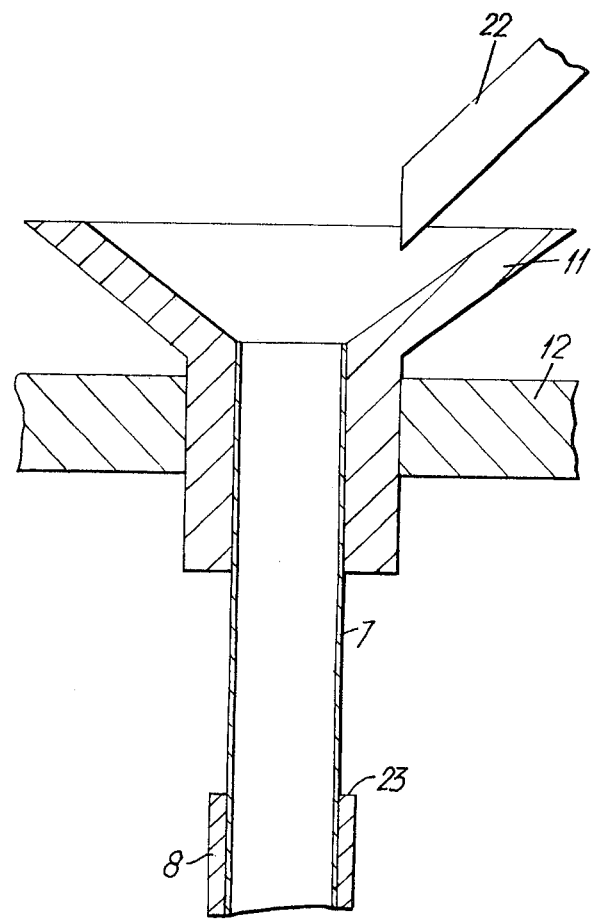
Figure 5:
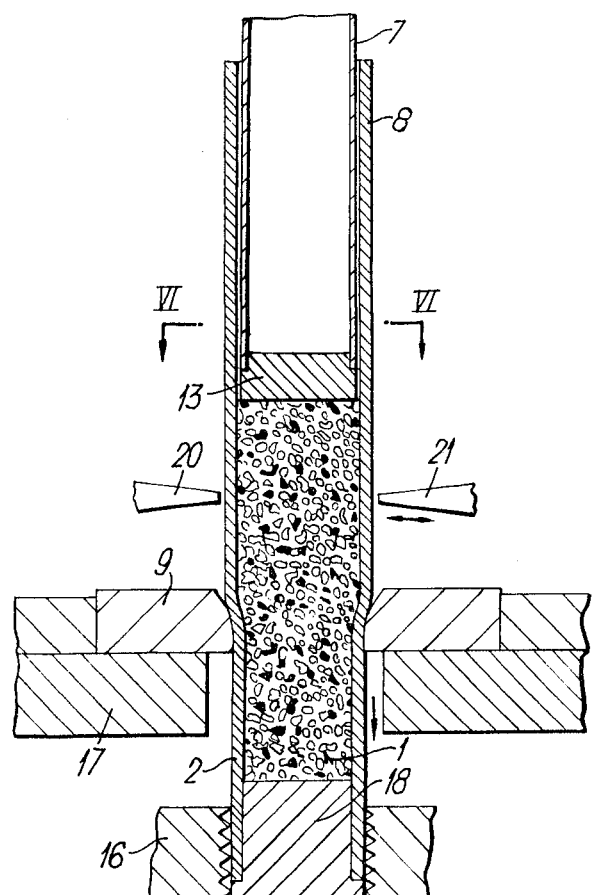
Figure 6:
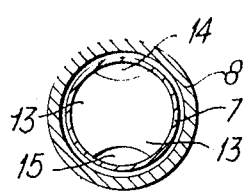

The invention will be further illustrated by a description, by way of example, of three forms of composite metal sheathed welding electrode and of the preferred method of manufacturing a composite metal sheathed welding electrode with reference to the accompanying drawings, in which:

FIGS. 1 to 3 are cross-sectional views of the three forms of welding electrode;

FIGS. 4 and 5, respectively, are elevations partly in section of upper and lower parts of apparatus for use in the preferred method of manufacture, and FIG. 6 is a cross-section taken on the line VI—VI in FIG. 5.

The composite welding electrode shown in FIG. 1 consists of a core 1 of compacted particulate material or a compacted mixture of two or more materials consisting of or including a de-oxidising agent enclosed in a seamless metallic sheath 2. FIG. 2 shows a composite welding electrode similar in form to that shown in FIG. 1 but with an outer metallic tube 3 tightly gripping the sheath 2. The third form of welding electrode shown in FIG. 3 is similar to that shown in FIG. 1 but has a metal wire 4 embedded in and extending longitudinally along the length of the core 1.

Specific examples of these forms of composite welding electrode will now be given as illustrative of the wide application of the invention.

EXAMPLE I

A composite welding electrode as shown in FIG. 1 for aluminum bronze welding comprises a core of a compacted powdered mixture of aluminium and a fluxing agent, for instance of the borax/fluoride type, enclosed in copper sheath, the electrode having an overall diameter of 3.0 mm. The electrode gives an aluminium bronze welding containing 7.5 percent aluminium. The aluminium and fluxing agent have particle sizes in the range 50 – 300 microns and the copper sheath has an initial bore of 12.7 mm and a wall thickness of 2.63 mm. After manufacture of the electrode by the method as described with reference to FIGS. 4 to 6 the density of the finished electrode is 60–70 percent of the theoretical maximum density.

EXAMPLE II

A hard facing composite welding electrode is substantially as in Example I but has an aluminium/copper ratio such that a bronze with 30 percent aluminium is produced.

EXAMPLE III

A composite welding electrode as shown in FIG. 2 for aluminium bronze welding comprises a core of a compacted powdered mixture of aluminium and a fluxing agent, for instance of the borax/fluoride type, enclosed in a composite sheath comprising an inner part of aluminium and an outer part of copper. The electrode has an overall diameter of 3.0 mm.

EXAMPLE IV

A hard facing composite welding electrode as shown in FIG. 1 comprises a core of a compacted powdered mixture of a refractory carbide, for instance tungsten carbide, and a deoxidising agent, for instance silicon manganese, with or without alloying constitutents in the form of ferro-alloys, enclosed in a sheath of mild or alloy steel. The electrode has an overall diameter of 3.0 mm.

EXAMPLE V

A composite welding electrode as shown in FIG. 3 is substantially in accordance with the electrode of Example IV but has a wire of an alloying agent, for instance nickel, embedded in the core.

Referring to FIGS. 4 to 6 in the preferred method of manufacturing a composite welding electrode of the kind as shown in FIG. 1 a guide tube 7 is a sliding fit in the upper part of a copper sheath tube 8, the upper end of the guide tube being adjustably supported in a feed funnel 11 mounted in a fixed cross-member 12. The lower end of the guide tube 7 carries a guide 13 which, as seen in FIG. 6, is formed with passages 14 and 15 through which a powdered mixture 1 of aluminium and a fluxing agent fed into the guide tube by the feed funnel 11 can flow into the space between the guide and a reducing die 9.

The sheath tube 8 is drawn down by passage through the reducing die 9 to form the sheath 2 of the electrode. The lower part of the sheath tube 8 is gripped in a chuck 16 which can be moved downwards with respect to a fixed table 17, carrying the die 9, by means of a hydraulic ram (not shown), to draw the sheath tube 8 through the die 9 to reduce it in diameter and compact the powdered mixture 1 of aluminium and fluxing agent. The lower end of the sheath 2 is closed by a plug 18. During the drawing operation the sheath tube 8 is laterally vibrated by vibrating hammers 20 and 21 actuated by magnetic or pneumatic means, a suitable frequency being 150 strokes/minute. The powdered mixture 1 is continuously fed into the funnel 11 through a spout 22 to maintain a sufficient supply of powder above the guide 13.

In preparation for the drawing operation, the lower end of the sheath tube 8 is first reduced in diameter to enable it to be passed through the die 9. The guide tube 7 carrying the funnel 11 is then inserted into the sheath tube 8 and the plug 18 is fitted into the lower end of the sheath tube. The whole assembly is lowered into the die 9, the plug 18 and the lower end of the tube 8 are gripped by the chuck 16 and the funnel is secured in the cross-member 12. Finally the guide 13 is adjusted with respect to the funnel 11 to provide the desired spacing between it and the die 9 to enable a column of powdered mixture 1 of a height at least sufficient to avoid push-back of powdered mixture to collect between the die and the guide.

As drawing down of the sheath tube 8 progresses, the upper end 23 of the sheath tube slides along and is supported by the guide tube 7. During the drawing operation free flowing powdered mixture 1 is continuously fed through the spout 22 and funnel 11 into the guide tube 7 and the sheath tube 8 is vibrated by the hammers 20 and 21.

After the sheath 2 filled with compacted powdered mixture has been removed from the apparatus shown in FIGS. 4 to 6 the overall diameter of the filled sheath is reduced further by drawing the filled sheath through a series of dies of decreasing size to compact further the powdered core and to reduce the filled sheath to an overall diameter of 3.0 mm, at which diameter it is suitable for use as a composite welding electrode.

The method of the present invention enables composite welding electrodes to be made in which the ratios of core diameter/sheath diameter may lie over a wide range; moreover composite electrodes having an overall diameter in the range of 1.5 to 3.0 mm or less can be manufactured if required. In addition to the known advantages of composite welding electrodes having seamless sheaths, composite electrodes made by the method of the present invention have substantially uniform electrical characteristics throughout their lengths.

What we claim as our invention is:

1. A method of manufacturing a composite metal sheathed welding electrode as a continuous operation which comprises drawing a preformed metallic tube containing a material selected from the group of materials consisting of a deoxidizing agent and a mixture of at least two materials including a deoxidizing agent, which material is in particulate form and is suitable for constituting the core of a composite metal sheathed welding electrode, substantially vertically downward through a drawing die of such a form that the tube is reduced in diameter during its passage through the die and feeding powder or granules into a part of the tube in advance of the die at a rate to maintain the said part sustantially full of particles, the height of the column of particles above the die being at least sufficient to avoid "push-back" of particles, and subsequently further reducing the overall diameter of the filled tube so formed to compact further the particulate core and to reduce the filled tube to an overall diameter rendering it suitable for use as a composite metal sheathed welding electrode.

2. A method as claimed in claim 1, wherein the preformed tube is of a composite form comprising inner and outer parts, the outer part being of a different metallic material from that of the inner part.

3. A method as claimed in claim 1, wherein before the filled tube is finally reduced to an overall diameter to render it suitable for use as a composite metal sheathed welding electrode a second tube of a metallic material different from that of the first tube is drawn over the filled tube and is reduced in diameter to grip the filled tube and the overall diameter of the filled composite tube so formed is further reduced to an overall diameter rendering it suitable for use as a composite metal sheathed welding electrode.

4. A method as claimed in claim 1, wherein compaction is effected by subjecting the tube to an operation selected from the group of operations consisting of agitation, vibration and oscillation.

5. A method as claimed in claim 1, wherein at least one rod of a metallic material is positioned in the tube before it is filled with the particulate material.

6. A method as claimed in claim 1, wherein the overall diameter of the particulate tube is reduced further by drawing the filled tube through a series of dies of decreasing size.

7. A method as claimed in claim 6, wherein the filled tube is annealed between passes through the dies.

8. A method as claimed in claim 1, wherein the overall diameter of the filled tube is reduced further by drawing the filled tube through a series of rolls.

9. A method as claimed in claim 1, wherein the particulate material includes slag-forming and alloying additives.

10. A method as claimed in claim 1, wherein the core material comprises particulate aluminium and a particulate fluxing agent and the tube is of copper.

11. A method as claimed in claim 1, wherein the core material comprises particulate aluminium and a particulate fluxing agent and the tube is of composite form comprising an inner part of aluminium and an outer part of copper.

12. A method as claimed in claim 1, wherein the core material comprises a particulare refractory carbide and a particulate fluxing agent and the tube is of steel.

13. A method as claimed in claim 1, wherein the core material comprises a particulate refractory carbide and a particulate fluxing agent, a wire of nickel is embedded in the core, and the tube is of steel.

* * * * *

UNITED STATES PATENT OFFICE
CERTIFICATE OF CORRECTION

Patent No. 3,834,002            Dated September 10, 1974

Inventor(s) Anthony Chamberlen Sissons et al.

It is certified that error appears in the above-identified patent and that said Letters Patent are hereby corrected as shown below:

Claim 6 - Column 6 Line 18 --particulate tube--
should read --filled tube--.

Claim 12 - Column 6 Line 38 --particulare--
should read --particulate--.

In the Assignee --Pyrotenox-- should read --Pyrotenax--.

Signed and sealed this 26th day of November 1974.

(SEAL)
Attest:

McCOY M. GIBSON JR.
Attesting Officer

C. MARSHALL DANN
Commissioner of Patents